Feb. 20, 1951

F. A. HEDWALL 2,542,673

SAUSAGE FORMING MACHINE

Filed Oct. 13, 1947

INVENTOR.
F. A. Hedwall
BY
ATTYS

Feb. 20, 1951   F. A. HEDWALL   2,542,673
SAUSAGE FORMING MACHINE
Filed Oct. 13, 1947   4 Sheets-Sheet 3

INVENTOR.
F. A. Hedwall
BY
ATTYS

Feb. 20, 1951 F. A. HEDWALL 2,542,673
SAUSAGE FORMING MACHINE
Filed Oct. 13, 1947 4 Sheets-Sheet 4

INVENTOR.
F. A. Hedwall
BY
*[signature]*
ATTYS

Patented Feb. 20, 1951

2,542,673

UNITED STATES PATENT OFFICE 2,542,673

SAUSAGE FORMING MACHINE

Fredrick A. Hedwall, Sacramento, Calif.

Application October 13, 1947, Serial No. 779,617

2 Claims. (Cl. 17—34)

This invention is directed to, and it is an object to provide, a novel machine for manufacturing skinless-type wieners or sausages as a continuous process.

Another object of the invention is to provide a machine, as above, which includes mechanism to form ground sausage meat into an initially continuous cord of circular cross section, and to then cut such cord into sausage lengths; the mechanism working mainly within an oven so that cooking of the product is simultaneously accomplished.

A further object of the invention is to provide a sausage forming machine, to accomplish the results described in the preceding paragraph, which includes a pair of endless chains with closely adjacent runs driven in the same direction, and the corresponding links of the chains carrying mold blocks which engage in cooperating relation, when in said runs, to form a continuous traveling mold; there being pressure means to feed the sausage mix into such continuous mold adjacent one end and to cut the resultant cord into sausage lengths adjacent the opposite end.

An additional object is to provide cooperating mold blocks of novel design arranged, when engaged, to prevent improper molding or leakage of the initially ground sausage meat.

It is also an object to provide a novel pressure means for feeding the ground sausage meat to such continuous traveling mold.

A further object of the invention is to provide a practical and efficient sausage forming machine, and one which will be exceedingly effective for the purpose for which it is designed.

These objects are accomplished by means of such structure and relative arrangement of parts as will fully appear by a perusal of the following specification and claims.

Figure 1:
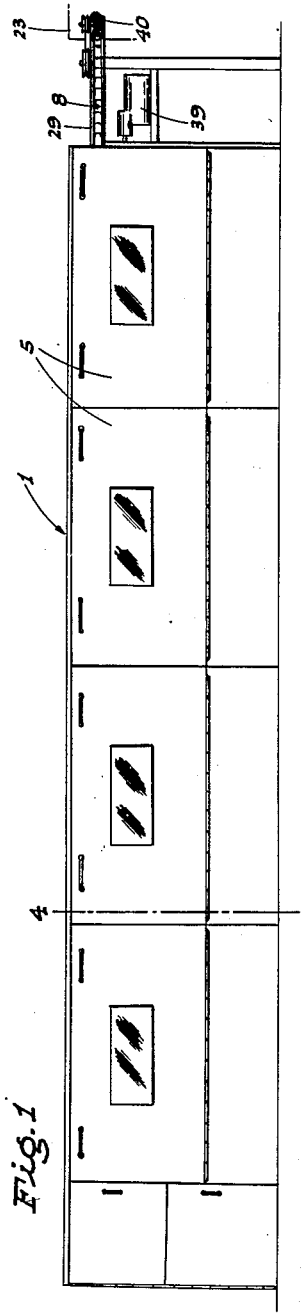
Fig. 1 is a side elevation of the sausage forming machine.
Figure 2:
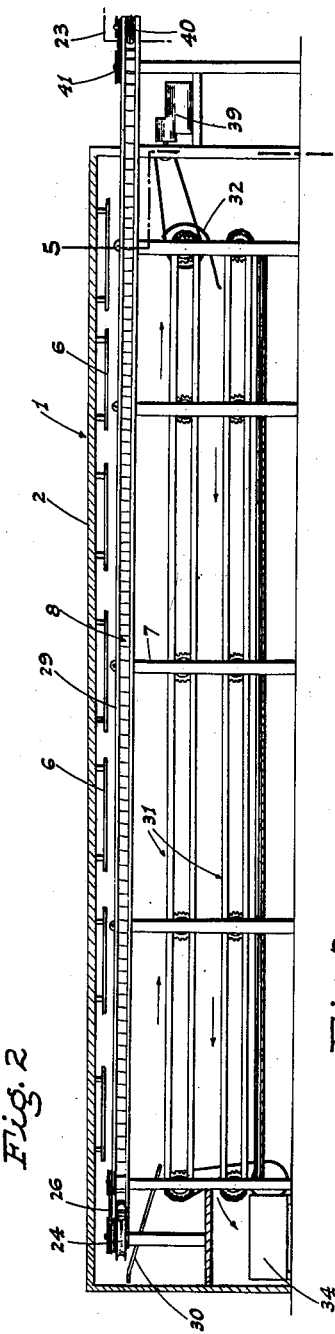
Fig. 2 is a sectional elevation of the machine.

Referring now more particularly to the characters of reference on the drawings, the sausage forming machine comprises a horizontal, elongated housing 1, which—in the main—is in the form of an oven; said housing including a top 2 and a bottom 3 connected by sidewalls 4. On one side the walls 4 are in the form of access doors 5.

Within the longitudinal oven 1 there are heating units, preferably electrically actuated, secured to the inside surface of the top 2 and bottom 3; such heating units being indicated generally at 6. These units 6 are energized through the medium of a control circuit (not shown).

Within the housing 1 there is an upstanding, elongated skeleton frame, indicated generally at 7. which terminates at the top some distance below the top 2 of said housing 1.

A pair of endless chains 8 are journaled in the housing 1 at the top of the skeleton frame 7 and extend lengthwise and horizontally through the housing 1, and being exposed at one end thereof, as shown. The endless chains 8 are mounted in side by side relation, with adjacent runs close to each other for the purpose hereinafter described.

Figure 3:
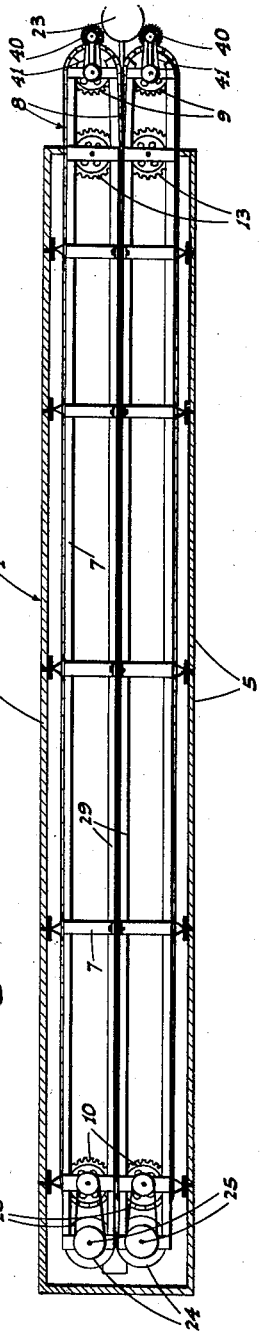
Fig. 3 is a sectional plan view of the same.
Figure 4:
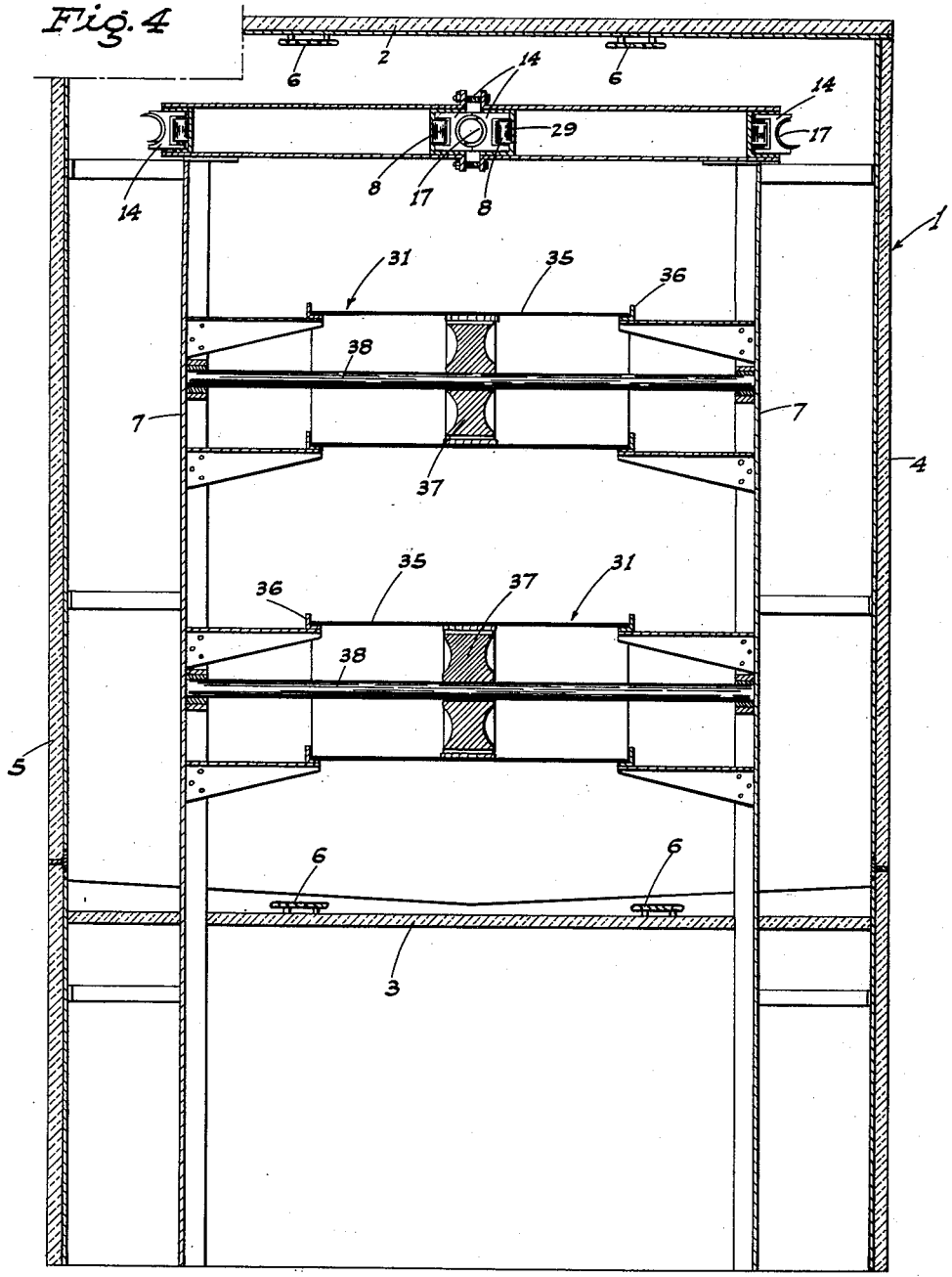
Fig. 4 is an enlarged cross section of the machine on line 4—4 of Fig. 1.
Figure 5:
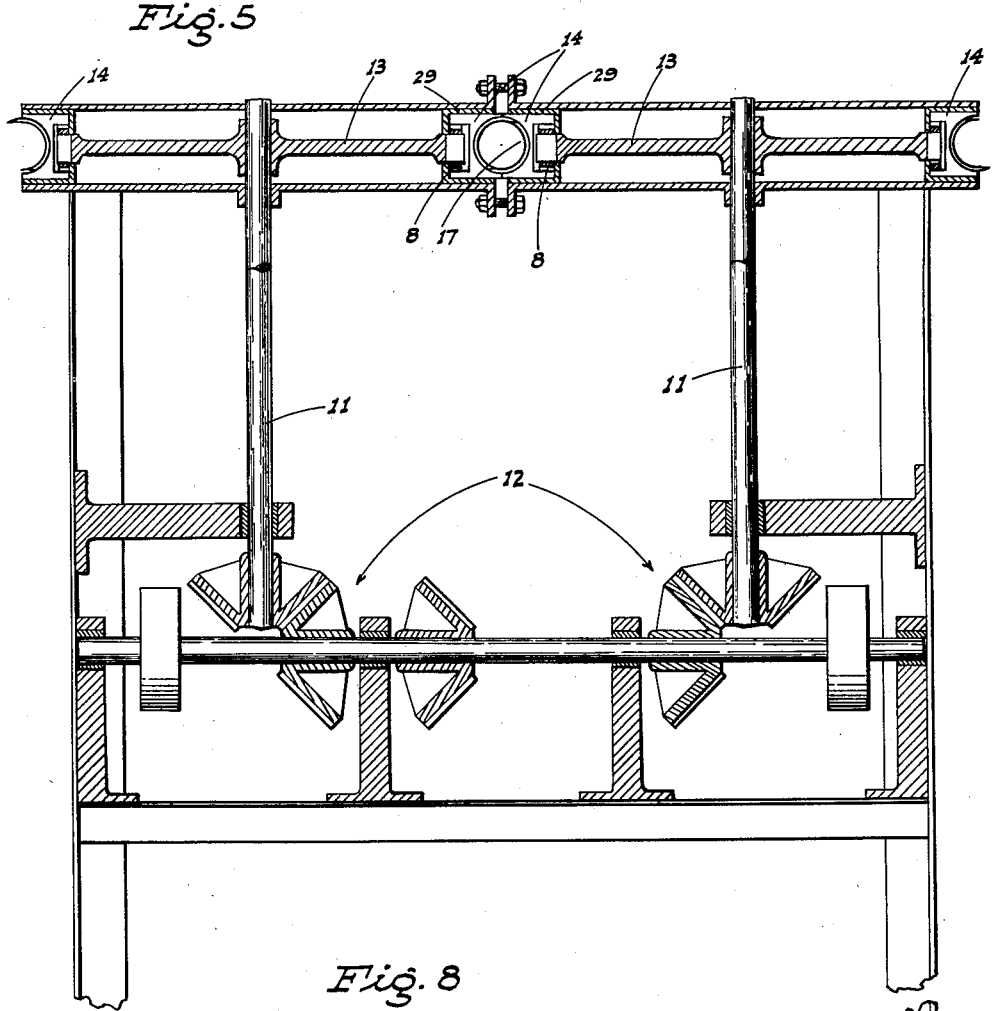
Fig. 5 is an enlarged cross section on line 5—5 of Fig. 2.
Figure 8:
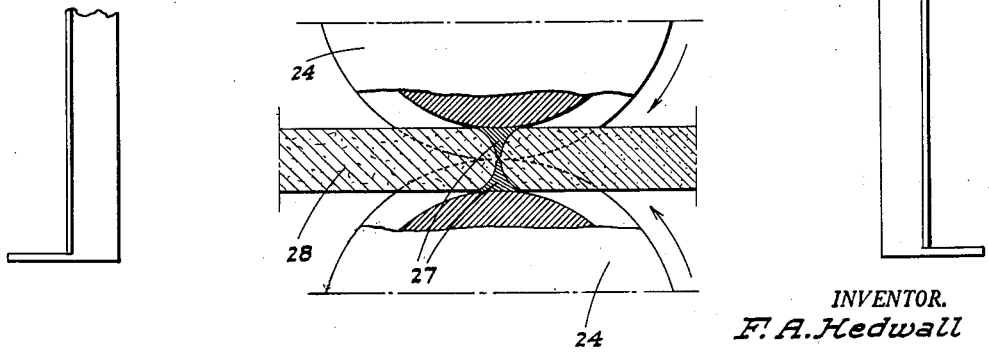
Fig. 8 is an enlarged fragmentary plan view of the rotary cutting unit.
Figure 6:
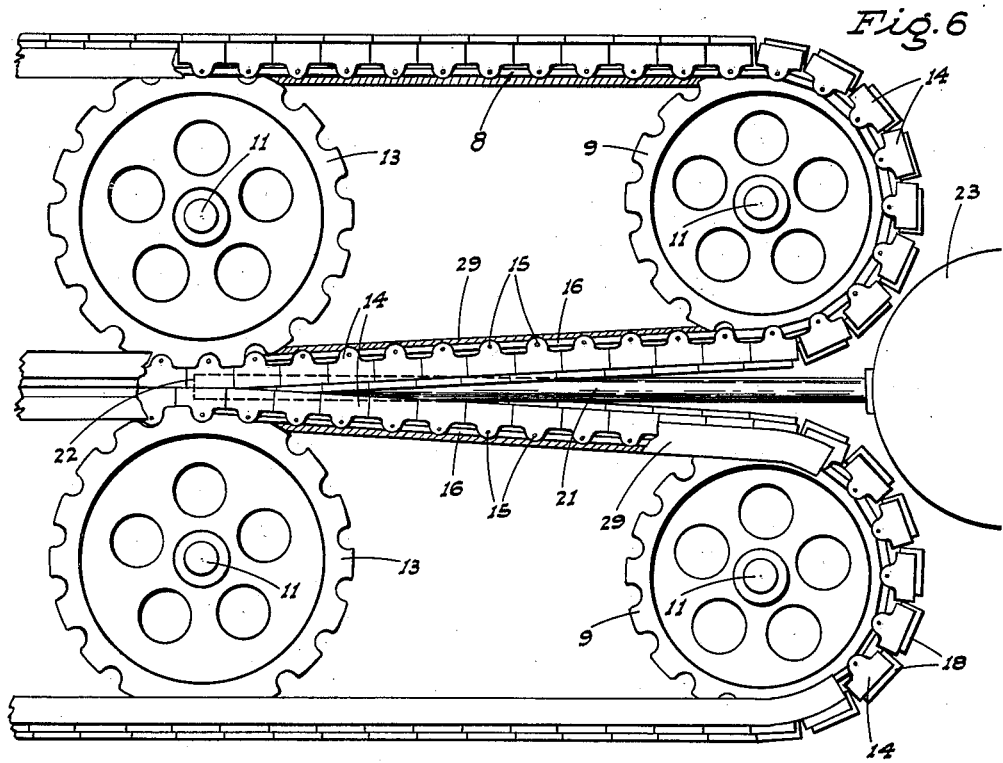
Fig. 6 is an enlarged fragmentary plan view of the forward end of the chain assembly which provides the continuous traveling mold, including an illustration of the sausage meat feeding means or stuffer.
Figure 7:
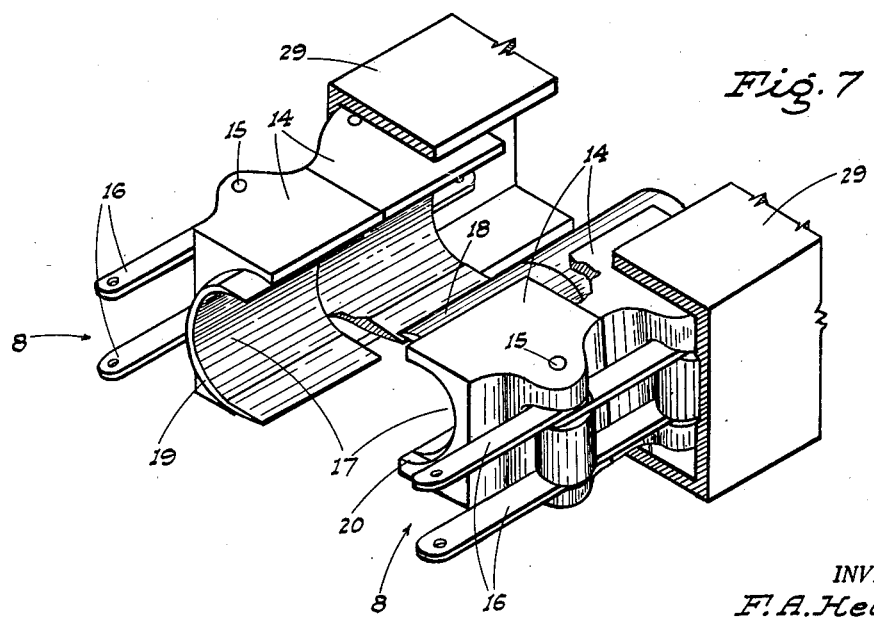
Fig. 7 is an enlarged fragmentary perspective view illustrating the mold blocks and the manner of their mounting on the chains and guided support in the corresponding channels.

The chains 8 are supported, at what may be termed their lead end, by a pair of sprockets 9, and are carried, at what may be termed the discharge end, by other sprockets 10. The sprockets 9 and 10 are fixed on vertical spindles 11, as shown in Fig. 5, and at one end of the chain assembly said spindles are actuated by a driven gear assembly 12. This gear assembly may be driven from any suitable power source, preferably an electric motor. The chains are driven so that the adjacent runs thereof travel in the same direction, moving between the lead and discharge ends of the chain assembly, i. e. moving from right to left in Fig. 3.

The sprockets 9 are spaced apart, transversely of the machine, a somewhat greater distance than the sprockets 10, whereby the adjacent runs of the chains initially move in converging relation but soon assume a parallel relationship by reason of their passage over idler sprockets 13, having substantially the same transverse spacing as the sprockets 10. Thus, the adjacent runs of the chains 8 travel in substantial parallelism between the sprockets 13 and the sprockets 10.

The endless chains 8 are fitted with a multiplicity of sectional forms or mold blocks 14; each such mold block being pivotally connected to a corresponding one of the pivot pins 15 which connect the chain links 16. The mold blocks 14 project laterally outwardly from the chains 8 whereby when traveling along the adjacent runs of said chains, such mold blocks project toward each other.

The mold blocks are shaped to support, and are fixed with, laterally outwardly facing, substantially semi-circular molds 17; and adjacent molds, when the blocks are traveling with the adjacent runs, not only abut each other at the ends but cooperatively engage at the longitudinal edges with corresponding molds of the blocks on the opposite run. Thus, as the chains move between the sprockets 13 and 10, the molds 17 form a continuous traveling mold whose bore is of circular cross-section and of a diameter equal that of the sausage to be formed.

In order to assure that such continuous traveling mold is sealed against leakage between the mold blocks 14, the molds 17 have tapered complementary longitudinal edges 18 which lap each other when corresponding blocks 14 of the runs are in engagement.

Also, the molds 17 are arranged so that they project axially, as skirts 19, beyond one end of the corresponding mold for complementary engagement in a semi-circular recess 20 in the adjacent end of the next mold block 14.

It will be seen that with the above arrangement, when the mold blocks 14 and molds 17 of the respective runs come into engagement for travel along said runs, the continuous traveling mold is interlocked effectively against leakage. A stuffer tube or nozzle 21 extends lengthwise centrally between the converging lead end portions of the chains 8 and terminates between the sprockets 13 at substantially the inception of the continuous traveling mold; the discharge end of said tube being indicated at 22.

At its outer end and free of the chain assembly, the stuffer tube or nozzle 21 is connected to a pressure feed unit 23, of any suitable type, adapted to feed previously ground sausage meat through the stuffer tube 21 under pressure. With the chains 8 moving in the described direction, and with sausage meat fed under pressure from the stuffer tube 21 out of its discharge end 22, such meat is deposited in the continuous traveling mold comprised of the cooperating molds 7 carried by the mold blocks 14. The volume of discharge from tube 21 is regulated according to the speed of the chain assembly, to the end that a continuous core or cord of sausage meat is formed by the molds 17 and conveyed along by the chain assembly.

At the discharge end of the chain assembly the continuous core or cord of formed sausage meat, which at this point has been partially cooked by reason of its passage in the oven forming housing 1, is cut—automatically—into sausage lengths by the following mechanism:

Beyond the discharge end of the chain assembly, but in the same horizontal plane, there are a pair of rotary cutters 24 disposed adjacent to, but on opposite sides of, the longitudinal axis of the continuous traveling mold; such cutters being carried on vertical spindles 25 driven by endless drives 26 from the adjacent ones of the spindles 11 of the chain assembly.

The rotary cutters 24 are fitted, at matching, circumferentially spaced points, with outwardly projecting blades 27; corresponding blades recurringly coming substantially into cutting engagement as the cutters 24 rotate. Thus, as the continuous cord of formed and set sausage meat, as indicated at 28, passes from the discharge end of the chain assembly, it is engaged between the rotary cutters 24 and cut into predetermined sausage lengths by the blades 27.

In order to properly guide the runs of the chains 8, both vertically and horizontally, particularly the adjacent runs which carry the elements which form the continuous traveling mold, said runs are supported in rigid guide channels 29; the guide channels corresponding to the adjacent runs of the chains facing laterally toward each other, and flaring—at the lead end portion of the chain assembly—to accommodate the converging chains.

The sausage lengths, as cut, fall downwardly from the rotary cutters 24 onto a baffle 30, which deflects them onto the upper run of an endless conveyor 31 which extends lengthwise and horizontally in the housing-formed oven below the chain assembly; said upper run traveling in the opposite direction to said chain assembly. At its discharge end the endless conveyor 31 feeds by a baffle 32 to the upper run of another endless conveyor 33 below the conveyor 31, but driven in the opposite direction. In this manner the sausage links are conveyed back and forth, i. e. in shuttle relation in the oven, until thoroughly cooked. The oven may also serve as a smoke box. From the discharge end of the endless conveyor 33 the cooked sausages deliver to any suitable receiver, as at 34.

The endless conveyors 31 and 33 include drapers or belts 35 which run at the edges in supporting guides 36, and which drapers or belts are driven by drums 37 on cross shafts 38, such shafts being journaled in the skeleton frame 7, and driven in any suitable manner from a power unit 39.

In order to prevent undue adherence of the sausage meat to the working faces of the molds 17, such molds are cleaned and oiled, preferably at the lead end of the chain assembly, by rotary brush units 40 driven by endless drives 41 from the adjacent spindles 11; these brush units being preferably shaped to work in matching relation to the molds 17.

The lead end portions of the chain assembly are carried outside of the oven forming housing 1 in order to permit of a certain cooling of the chains and the above described cleaning and oiling of the molds by the rotary brushes 40.

From the above description it will be recognized that the invention provides a very practical and efficient machine for the manufacture, as a continuous operation, of skinless type wieners or sausages; the machine functioning smoothly, yet having substantial capacity.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A sausage forming machine comprising a frame, a pair of endless flexible members supported on said frame and having runs facing each other and moving in the same direction, semicircular outwardly opening mold sections on the outer faces of said flexible members, the said members at the lead end of said runs being spaced apart a distance to hold the mold sections on the respective runs separated, said members then converging toward each other to a point at which the mold sections meet in complementary relation, means then maintaining said runs parallel for a predetermined distance whereby to form a longitudinally continuous mold for said predetermined distance, a source of material supply, and a tube leading from said source of supply and extending midway between the converging portion of said members and projecting a short way into said continuous mold.

2. A machine as in claim 1 in which the mold sections are so formed as to have relatively overlapping ends and edges when they meet in complementary relationship.

FREDRICK A. HEDWALL.

REFERENCES CITED

The following references are of record in the file of this patent:

UNITED STATES PATENTS

| Number | Name | Date |
| --- | --- | --- |
| 994,714 | Boyle | June 13, 1911 |
| 1,922,783 | Schmidt | Aug. 15, 1933 |
| 2,014,384 | Kruttschnitt | Sept. 17, 1935 |
| 2,208,651 | Wallace | July 23, 1940 |
| 2,397,446 | Tansley | Mar. 26, 1946 |